(12) United States Patent
Ishikura et al.

(10) Patent No.: US 11,770,487 B2
(45) Date of Patent: Sep. 26, 2023

(54) READING DEVICE, IMAGE FORMING APPARATUS, AND STATE DETECTION METHOD TO DETECT A MULTI-FEED STATE OF AN OBJECT USING REFLECTED LIGHT IN A VISIBLE WAVELENGTH AND AN INVISIBLE WAVELENGTH AND COMPARING READING VALUE RESULTS TO REFERENCES ASSOCIATED WITH THE INVISIBLE AND VISIBLE WAVELENGTH REFERENCE VALUES

(71) Applicants: Kazuki Ishikura, Tokyo (JP); Masamoto Nakazawa, Kanagawa (JP)

(72) Inventors: Kazuki Ishikura, Tokyo (JP); Masamoto Nakazawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/489,790

(22) Filed: Sep. 30, 2021

(65) Prior Publication Data
US 2022/0109769 A1    Apr. 7, 2022

(30) Foreign Application Priority Data

Oct. 1, 2020 (JP) ................... 2020-167346

(51) Int. Cl.
*H04N 1/00* (2006.01)
*H04N 1/047* (2006.01)
*G06F 3/12* (2006.01)

(52) U.S. Cl.
CPC ..... *H04N 1/00753* (2013.01); *H04N 1/00734* (2013.01); *H04N 1/00769* (2013.01)

(58) Field of Classification Search
CPC .......... H04N 1/00734; H04N 1/00753; H04N 1/00769; H04N 1/00034; H04N 1/00037; H04N 1/00045; H04N 1/00092
USPC ................................ 358/400–404, 1.11–1.18
See application file for complete search history.

(56) References Cited

U.S. PATENT DOCUMENTS

| | | | |
|---|---|---|---|
| 2002/0079644 A1* | 6/2002 | Phinney ................... | B65H 7/06 399/18 |
| 2008/0088084 A1* | 4/2008 | Shimazaki ............... | B65H 7/12 271/262 |
| 2010/0027061 A1 | 2/2010 | Nakazawa | |
| 2017/0287254 A1* | 10/2017 | Takeda .................. | B65H 31/00 |
| 2017/0295298 A1 | 10/2017 | Ozaki et al. | |

(Continued)

FOREIGN PATENT DOCUMENTS

| | | |
|---|---|---|
| JP | 3575460 B2 * | 10/2004 |
| JP | 2008219176 A * | 9/2008 |

(Continued)

*Primary Examiner* — Chad Dickerson
(74) *Attorney, Agent, or Firm* — XSENSUS LLP

(57) ABSTRACT

A reading device includes an illuminator, an imaging device, a memory, and a detector. The illuminator illuminates an object to be read with light in an invisible wavelength range. The imaging device captures an image of the light reflected from the object to be read, within the invisible wavelength range. The memory holds a reference value of the object to be read. The detector detects a state of the object to be read, based on a difference between a level of a reading value of an invisible image captured within the invisible wavelength range and a level of the reference value.

13 Claims, 13 Drawing Sheets

(56) References Cited

U.S. PATENT DOCUMENTS

| | | |
|---|---|---|
| 2018/0146150 A1 | 5/2018 | Shirado et al. |
| 2019/0066428 A1* | 2/2019 | Adachi ................. G06V 20/80 |
| 2019/0238687 A1 | 8/2019 | Nikaku et al. |
| 2019/0238717 A1 | 8/2019 | Inage et al. |
| 2019/0327387 A1 | 10/2019 | Hashimoto et al. |
| 2020/0020191 A1* | 1/2020 | Takahashi .............. G07D 11/16 |
| 2020/0053230 A1 | 2/2020 | Nakazawa et al. |
| 2020/0120228 A1 | 4/2020 | Ozaki et al. |
| 2021/0014441 A1 | 1/2021 | Ohmiya et al. |

FOREIGN PATENT DOCUMENTS

| | | |
|---|---|---|
| JP | 2018-190213 | 11/2018 |
| JP | 2019-080169 | 5/2019 |

* cited by examiner

SINGLE FEEDING

MULTI-FEEDING

COLORED PAPER (PEACH COLOR)

COLORED PAPER (YELLOW)

READING DEVICE, IMAGE FORMING APPARATUS, AND STATE DETECTION METHOD TO DETECT A MULTI-FEED STATE OF AN OBJECT USING REFLECTED LIGHT IN A VISIBLE WAVELENGTH AND AN INVISIBLE WAVELENGTH AND COMPARING READING VALUE RESULTS TO REFERENCES ASSOCIATED WITH THE INVISIBLE AND VISIBLE WAVELENGTH REFERENCE VALUES

CROSS-REFERENCE TO RELATED APPLICATION

This patent application is based on and claims priority pursuant to 35 U.S.C. § 119(a) to Japanese Patent Application No. 2020-167346, filed on Oct. 1, 2020, in the Japan Patent Office, the entire disclosure of which is incorporated by reference herein.

BACKGROUND

Technical Field

Embodiments of the present invention relate to a reading device, an image forming apparatus, and a state detection method.

Related Art

Conventionally, when a reading device reads sheets of paper, a separating device separates one sheet from the sheets of paper so that the sheets of paper are read one by one with the reading device. If one sheet cannot be separated from the sheets of paper, multiple sheets are fed in a stacked state, causing a reading failure. For this reason, there has been proposed a technology of detecting such multi-feed using an image reading result.

For example, a technology is known that the density of a read image is compared with the density of a read image of one document to detect multi-feed.

However, in the technology using the image reading result in the related art, there is a problem in that when a sheet of paper is read in a visible wavelength region, the accuracy of detecting the state of sheets of paper such as multi-feed may decrease.

SUMMARY

According to an embodiment of the present disclosure, there is provided a reading device that includes an illuminator, an imaging device, a memory, and a detector. The illuminator illuminates an object to be read with light in an invisible wavelength range. The imaging device captures an image of the light reflected from the object to be read, within the invisible wavelength range. The memory holds a reference value of the object to be read. The detector detects a state of the object to be read, based on a difference between a level of a reading value of an invisible image captured within the invisible wavelength range and a level of the reference value.

According to another embodiment of the present disclosure, there is provided an image forming apparatus that includes the reading device and an image forming device to form, on a medium, an image of the object read by the reading device.

According to still another embodiment of the present disclosure, there is provided a state detection method that includes illuminating, capturing, and detecting. The illuminating illuminates an object to be read with light in an invisible wavelength range. The capturing captures an image of the light reflected from the object to be read, within the wavelength range. The detecting detects a state of the object to be read based an a difference between a level of a reading value of an invisible image captured within the invisible wavelength range and a level of a reference value held in a memory.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
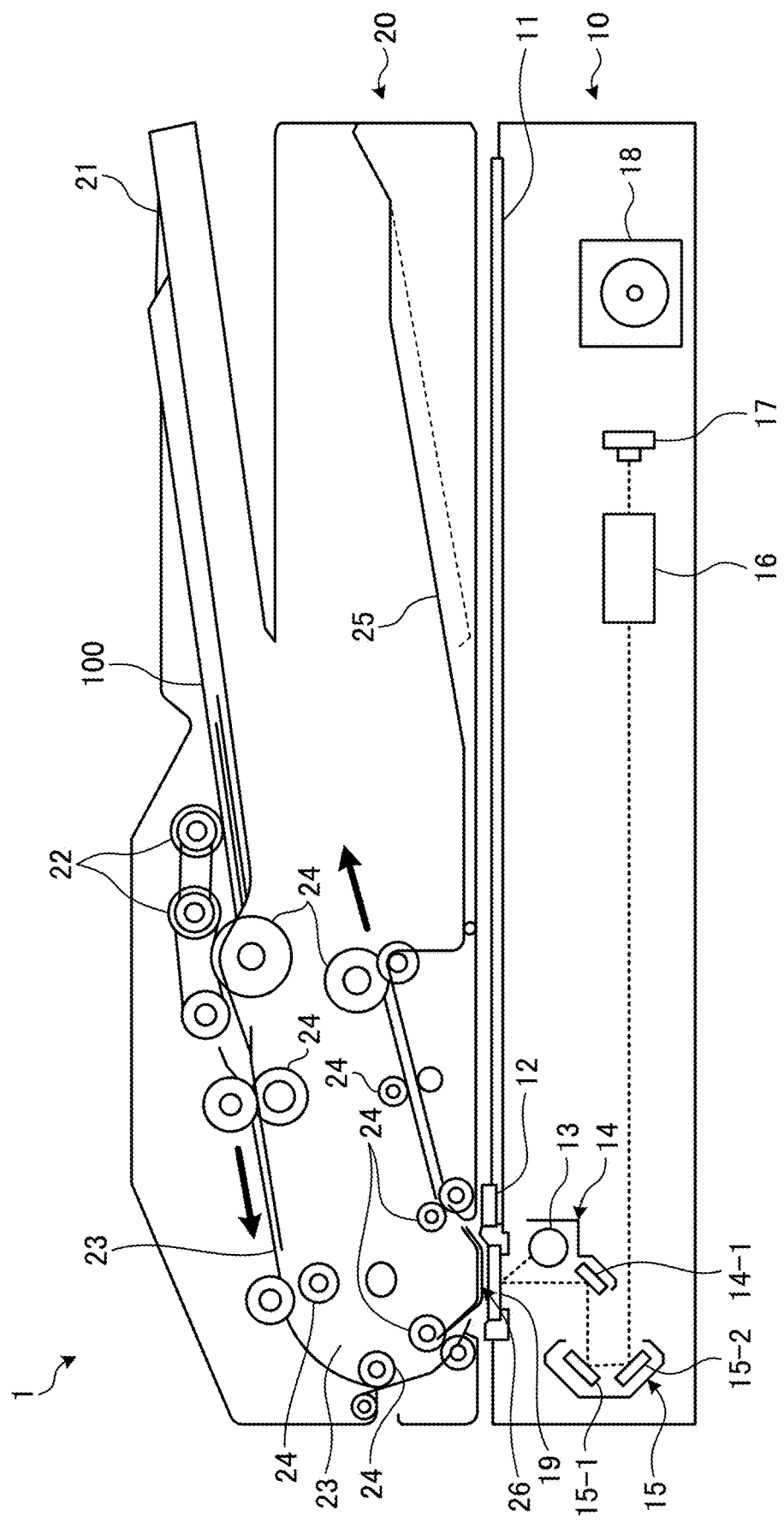
FIG. 1 is a diagram illustrating an example of an image forming apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Hereinafter, embodiments of a reading device, an image forming apparatus, and a state detection method are described in detail with reference to the accompanying drawings. In the following description, the term "visible" refers to a wavelength region of visible light (visible wavelength region), and the term "invisible" refers to a wavelength region of infrared rays or ultraviolet rays other than visible light. The invisible range of wavelengths (invisible range of wavelengths) is, for example, less than or equal to 380 nm or greater than or equal to 750 nm.

A description is given of a first embodiment of the present disclosure. FIG. 1 is a diagram illustrating an example of a reading device according to the first embodiment. FIG. 1 illustrates a configuration of the reading device including an automatic document feeder (ADF), according to the present embodiment.

A reading device main body 10 has a contact glass 11 on a top face, and includes, for example, a light source 13, a first carriage 14, a second carriage 15, a lens unit 16, and a sensor board 17 inside the reading device main body 10 that together serve as a scanner for a reduction optical system. In FIG. 1, the first carriage 14 has a light source 13 and a reflection mirror 14-1, and the second carriage 15 has reflection mirrors 15-1 and 15-2.

The light source 13 uses light sources of visible light and invisible light. For example, a light emitting diode (LED) (for example, red (R) color, green (G) color, or blue (B) color) in a visible wavelength region is used for visible light, and an infrared LED or the like is used for non-visible light. Alternatively, for example, a halogen lamp that covers both a wavelength region of visible light and a wavelength region of invisible light may be used. An object to be read is irradiated with the light that is emitted from the light source 13, and the light reflected by the object to be read is reflected by the reflection mirror 14-1 of the first carriage 14 or the reflection mirrors 15-1 and 15-2 of the second carriage 15. Then, the reflected light is incident on the lens unit 16, and an image of the object to be read is formed from the lens unit 16 onto the photo-sensing surface of the sensor board 17. The sensor board 17 includes a line sensor such as a charge coupled device (CCD) or a complementary metal oxide semiconductor (CMOS), and sequentially converts the image of the object to be read formed on the photo-sensing surface of the line sensor into an electrical signal. In the present embodiment, the sensor board 17 includes an imaging sensor that receives visible light and an imaging, sensor that receives invisible light. For example, R (Red), G (Green), and B (Blue) imaging sensors are used as imaging sensors for visible light to read a visible image of an object to be read. An invisible (IV) sensor, for example, an infrared (IR) sensor is used as an imaging sensor for invisible light to read an image of infrared light (invisible image) of reflected light. A reference white board 12 is used to correct, for example, the changes in radiation intensity of light of the light source 13 or the variations in the pixel array of the line sensor.

The reading device 1 is provided with a control board on the reading device main body 10, and controls each element of the reading device main body 10 and each element on the ADF 20 to perform scanning on an object with a predetermined scanning method. The object to be read is, for example, a recording medium on which characters, a pattern, or the like is formed or a recording medium before image formation. In the following description, a document sheet having a white background is taken as an example. The document sheet is also referred to as a sheet or a document, and a portion such as a character or a pattern formed on the sheet is referred to as, for example, a document image.

For example, the reading device 1 uses the ADF 20 to perform scanning of sheet-through type on a document 100. The ADF 20 is an example of a "feeder". In the configuration illustrated in FIG. 1, the reading device 1 uses a pickup roller 22 to separate a document 100 on a one-piece-by-one-piece basis from a stack of documents on a tray 21 of the ADF 20, and conveys the document 100 to a conveyance path 23. Then, a side of the document 100 to be read is scanned at a predetermined scanning, position, and the document 100 is ejected to an output tray 25. The document 100 is conveyed by the rotation of conveying rollers 24.

In the reading device 1, for example, the first carriage 14 and the second carriage 15 are moved to a predetermined home position and fixed thereto, and the document 100 is scanned and obtained when the document 100 passes through a gap between a scanning window 19 and a background portion 26. The scanning window 19 is a slit-shaped scanning window formed on a part of the contact glass and the document 100 is scanned in the sub-scanning direction as the document 100 is automatically conveyed and passes through the scanning window 19. The background portion 26 is a background member of a predetermined background color arranged at a position opposed to the slit. While the document 100 is passing through the scanning window 19, the reading device 1 uses multiple imaging sensors on the sensor board 17 to sequentially read the light that is emitted from the light source 13 and then reflected by the first face of the document 100 facing the scanning window 19. The first face of the document 100 may be the front side or the rear side of the document.

In the case of performing double-sided scanning of the document 100, for example, a turning, mechanism is arranged to reverse the front and back sides. As a turning mechanism is provided for the reading device 1, the document 100 can be reversed, and the second face of the document 100 can be scanned through the scanning window 19. However, no limitation is intended thereby, and the images of both sides of the document may be scanned using a different kind of mechanism or configuration other than the turning mechanism. For example, after the document 100 has passed through the scanning window 19, the second face of the document 100 may be scanned by a reading unit arranged on the rear side of the document 100. In such cases, for example, a member that is disposed at a position facing the reading unit serves as the background portion.

In the configuration of the reading device 1 according to the present embodiment, flatbed scanning can also be performed. More specifically, the ADF 20 is lifted to expose the contact glass 11, and the document 100 is directly disposed on the contact glass 11. Then, the ADF 20 is lowered to the original position, and the rear side of the document 100 is pressed and held by the lower portion of the ADF 20. In the flatbed scanning, as the document 100 is fixed, the first carriage 14 and the second carriage 15 are moved relative to the document 100 to scan the document. The first carriage 14 and the second carriage 15 are driven by a scanner motor 18 to scan the document 100 in the sub-scanning direction. For example, the first carriage 14 moves at a speed and the second carriage 15 moves at a speed ½ V which is half the speed of the first carriage 14 in conjunction with the movement of the first carriage 14. By so doing, the first nice of the document 100 on the contact glass 11 side is scanned. In such cases, the lower portion of the ADP 20, which is, for example, a white member that presses the document 100 from the rear side, serves as the background portion.

In the present embodiment, for example, the first carriage 14, the second carriage 15, the lens unit 16, and the sensor board 17 are separately illustrated, but these elements may be individually provided or may be provided as an integrated sensor module.

Next, a description is given of a configuration of a detector that detects the state of the document 100 being conveyed, according to an embodiment of the present disclosure. Here, the "state" refers to a state in which scanning assumed in advance cannot be performed on a document, such as multi-feed or mixing of different types of documents. In a device such as the reading device 1 that separates and conveys documents 100 one by one from a stack of documents, when the separation fails, multiple sheets of documents (for example, two document sheets) overlap with each other, thus causing multi-feed.

The inventors of the present application have found that, in the case of detecting the state such as multi-feed, the state can be more easily detected with an invisible range than a visible range. In the present embodiment, a configuration of the detector in the case of using the invisible range is described. The reason and result of using the invisible range is described later.

Figure 2:
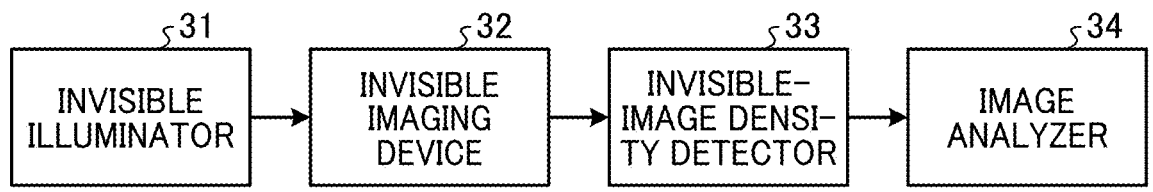
FIG. 2 is a diagram illustrating a configuration of a detector of the reading device of FIG. 1.

FIG. 2 is a diagram illustrating a configuration of the detector of the reading device 1 according to the present embodiment. The configuration of the detector is described in detail by taking the configuration of the reading device 1 as an example.

An invisible illuminator 31 is an illumination controller that illuminates an object to be read with invisible light. The invisible illuminator 31 includes the light source 13 illustrated in FIG. 1 and an illumination unit that lights on and off the light source 13, and the illumination unit controls switching of the infrared LED of the light source 13 to ON or OFF. The illumination unit turns on the infrared LED to illuminate an object to be read with infrared light.

The invisible imaging device 32 is an image capturing controller that captures an invisible image. For example, the invisible imaging device 32 includes the first carriage 14, the second carriage 15, the lens unit 16, and the sensor board 17 illustrated in FIG. 1 and drives, for example, the IR sensor on the sensor board 17 to capture an invisible image. Specifically, the invisible imaging device 32 receives infrared light, more specifically, reflected light of infrared light with which the object to be read is illuminated by an IR sensor and captures an invisible image. The above-described configurations of the invisible illuminator 31 and the invisible imaging device 32 are examples, and the configurations of the invisible illuminator 31 and the invisible imaging device 32 are not limited to the above-described configurations.

The invisible-image density detector 33 performs a density detection process on an invisible image output from the invisible imaging device 32. The density detection process is a process of obtaining a density (density level) from a read value of a region designated in the invisible image. For example, the invisible-image density detector 31 detects the density level from the read value of the entire image of a background portion of a document sheet. Note that the light transmittance and reflectance of the object to be read and the background portion vary depending on the wavelength region of the light with which the object to be read is irradiated. The value of the read value also varies due to the change in the transmittance or the reflectance. Here, the luminance level indicated by the sum of the amount of light reflected from the object to be read and the background portion is referred to as a density level for convenience. The relationship between the light reflected from the object to be read or the background portion and the density level is described later.

The image analyzer 34 outputs a state such as multi-feed based on the density obtained by the density detection. For example, the image analyzer 34 compares a density value obtained based on the invisible image with a reference value (density value of a background image in the case of one sheet of paper) held in advance in a storage unit such as a memory, and outputs information indicating an abnormal state (for example, a multi-feed state) of the document when there is a predetermined difference between the density value and the reference value. The predetermined difference may be, for example, a difference equal to or more than a threshold value.

Control units or processing units of the invisible illuminator 31, the invisible imaging device 32, the invisible-image density detector 33, and the image analyzer 34 may be implemented with, for example, application specific integrated circuits (ASIC), or may be functional units implemented by executing computer-configured programs.

Here, the invisible illuminator 31 is an example of an "illumination unit", the invisible imaging device 32 is an example of an "imaging unit", the invisible-image density detector 33 and the image analyzer 34 are examples of a "detection unit", and a storage unit or the like is an example of a "holding unit".

Figure 3:
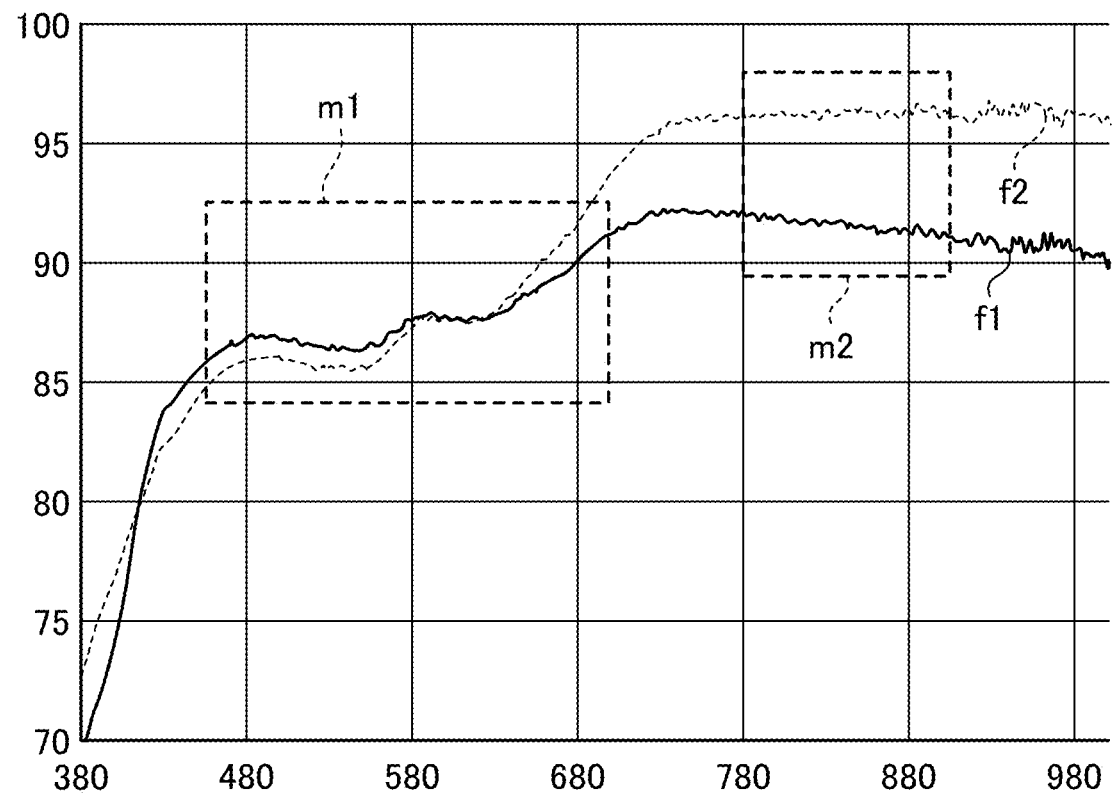
FIG. 3 is a graph chart illustrating measurement results of reflectance in the case where an object is irradiated with visible light and in the case where the object is irradiated with invisible light.
Figure 4A:
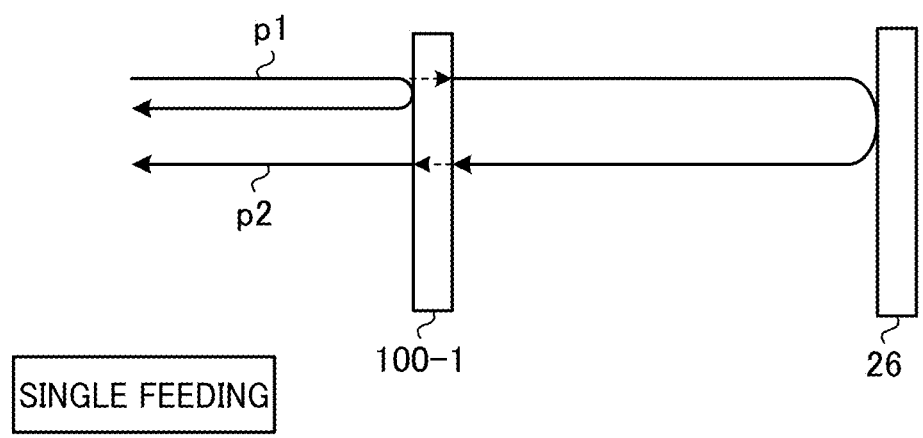
FIGS. 4A and 4B are diagrams illustrating the reflectance of light irradiated when one sheet of paper is single-fed and when two sheets of paper are multi-fed, using an optical model.
Figure 4B:
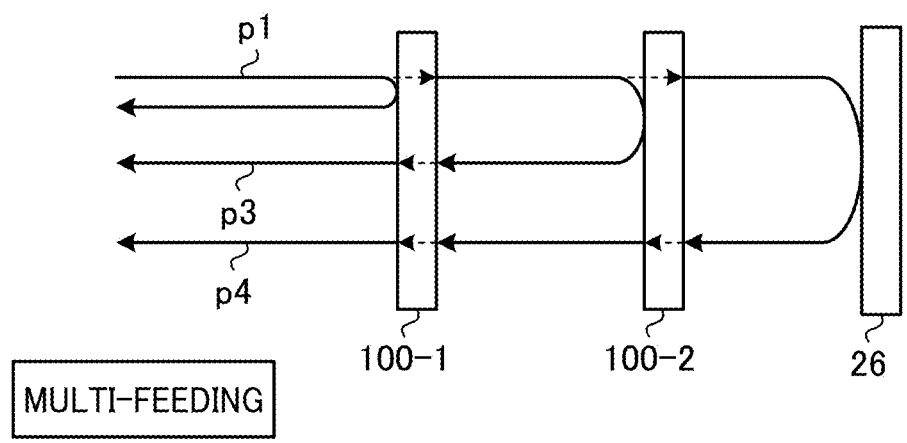
Figure 5:
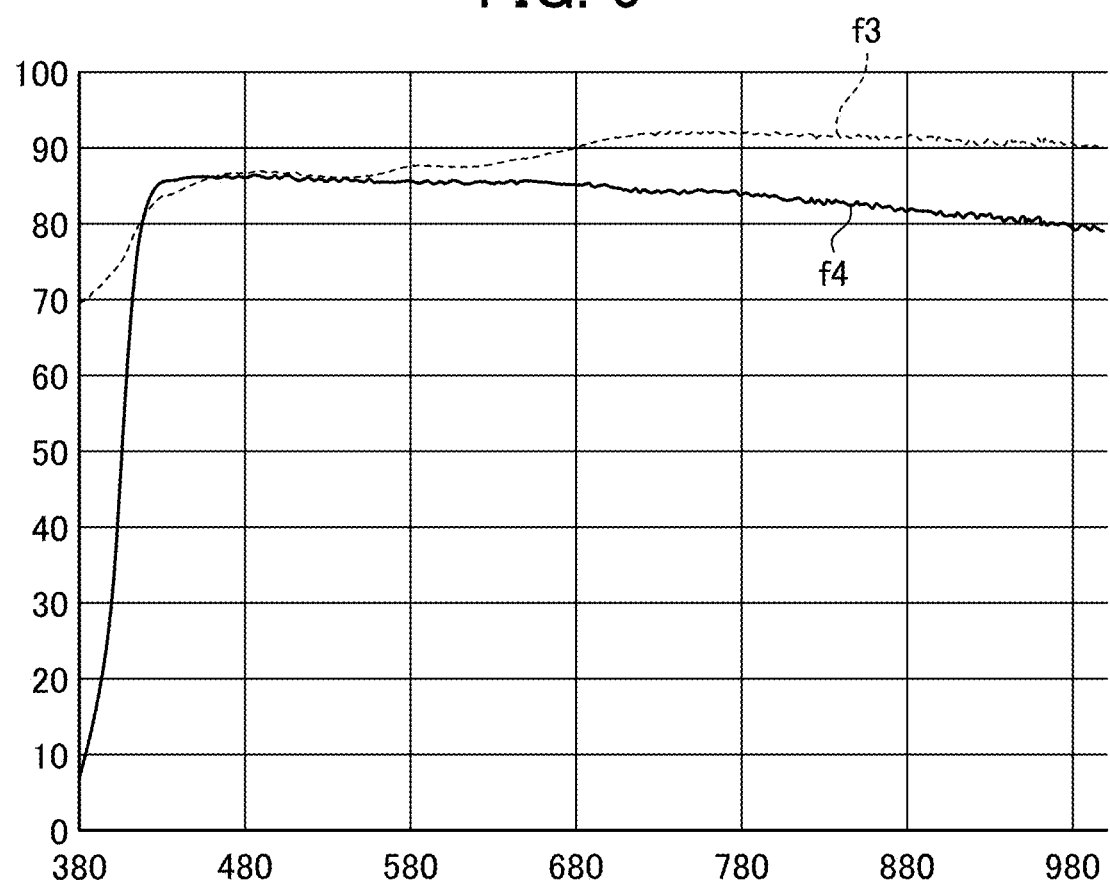
FIG. 5 is a chart illustrating the combination of sheets of paper and a background portion.

Next, with reference to FIGS. 3 to 5, some reasons and verification results are described regarding the fact that the state is more easily detected using the invisible range than the visible range.

FIG. 3 is a graph chart illustrating measurement results of reflectance in a case where an object is irradiated with visible light and in a case where the object is irradiated with invisible light. A graph f1 and a graph f2 represent the measurement results of reflectance in the case of one sheet of paper X and reflectance in the case of two sheets of paper X overlapped with each other. In the measurement, generally used white sheet of paper (hereinafter described as sheet of paper X in order to distinguish the white sheet of paper from other kinds of paper) is arranged with a white background portion 26 as a back surface. The horizontal axis represents the wavelength and the vertical axis represents the reflectance.

As illustrated in FIG. 3, when attention is paid to the measurement result of a range m1 in the visible range on the horizontal axis, the difference in reflectance between the graph f1 in the case of one sheet of paper X and the graph f2 in the case of two sheets of paper X is about 1% or less than 1% at the maximum. That is, it can be seen that there is almost no difference in measurement results between one sheet and two sheets when measured in the visible range. Considering variations in the read values of the imaging sensor, it can be seen that it is not possible to distinguish whether the difference is due to variations in the imaging sensor or due to a difference in reflectance caused by a difference in the number of sheets of paper X only by viewing the read values obtained in the visible range from the imaging sensor.

On the other hand, in the case of measurement in the invisible range, a sufficient difference occurs in a range m2 in the invisible range as illustrated in FIG. 3. That is, it is understood that the difference in the number of sheets of paper X can be distinguished by reading the light in the invisible range.

FIGS. 4A and 4B are diagrams illustrating the reflectance of light irradiated when one sheet of paper X is single-fed and when two sheets of paper X are multi-fed, using an optical model. FIG. 4A illustrates an optical model in the case of single feed. FIG. 4B illustrates an optical model in the case of multi-feed.

As illustrated in FIG. 4A, when there is one sheet of paper X, the imaging sensor reads reflection components p1 reflected by a first sheet of paper 100-1 and reflection components p2 transmitted through the first sheet of paper 100-1 and reflected by the background portion 26.

On the other hand, when there are two sheets of paper X, as illustrated in FIG. 4B, the imaging sensor reads the reflection components p1 reflected by the first sheet of paper 100-1, reflection components p3 transmitted through the first sheet of paper 100-1 and reflected by the second sheet of paper 100-2, and reflection components p4 also transmitted through the second sheet of paper 100-2 and reflected by the background portion 26.

Accordingly, the density value varies, depending on the reflection component to be added, between the single feed and the multi-feed, and the relationship is as follows, Density Value in Single Feeding: p1+p2
Density Value in Double feeding: p1+p3+p4

Here, if the reflection components p4 are ignored because the reflection components p4 have passed through the sheet of paper X four times, the light absorption properties of the sheet of paper X are also ignored, then there is a sufficient difference between the reflection components p2 and the reflection components p3, a difference arises in level between the single feed and the multi-feed. Therefore, detecting the density value allows determination of single feed or multi-feed. Based on such conditions, the reading device 1 according to the present embodiment can appropriately select a combination of the sheet of paper X and the material of the background portion 26 in addition to the combination of the white sheet of paper and the white background portion, so as to expand the types of sheet of paper capable of detecting multi-feed.

FIG. 5 is a chart illustrating the combination of the sheet of paper X and the background portion 26. In FIG. 5, the horizontal axis represents wavelength and the vertical axis represents reflectance, and the measurement results of the spectral reflectance of each of the sheet of paper X and the background portion 26 are illustrated together. A graph f3 indicates the measurement result of the sheet of paper X, and a graph f4 indicates the measurement result of the background portion 26. In the measurement results illustrated in FIG. 5, it can be seen that the relationship between the sheet of paper X used for measurement and the background portion 26 is such that the difference in reflectance is small on the short-wavelength side of less than 500 nm and the difference in reflectance increases an the long-wavelength side of not less than 500 nm. Note that the above value of 500 nm is an example.

That is, the reflectance of the sheet of paper (white sheet of paper in this example) increases toward the long wavelength side. On the other hand, a portion whose reflectance decreases toward the long wavelength side is used as the background portion 26.

It the sheet of paper X and the background portion 26 having the spectral characteristics as illustrated in FIG. 5 are used and light in the ling wavelength side, that is, in the invisible range is irradiated, a sufficient difference in reflectance occurs between the reflection components p2 and p3. Therefore, multi-feed can be detected from the density value.

The invisible range to be used has been described to be not greater than 380 nm or not smaller than 750 nm as an example. In the case of using the range, it is preferable to use the range of not smaller than 730 nm or a wavelength range in which the above-described action is equally exhibited.

The state in which documents 100 overlap each other or the state in which different types of documents are mixed occurs not only in the case of a conveyance method such as a sheet-through method but also in the case of, for example, a flatbed method. In both cases, reading which is assumed in advance cannot be performed. Therefore, the detector described in this embodiment may be applied to other reading methods as appropriate.

Such a configuration can accurately detect the state of a sheet of paper such as multi-feed with respect to a sheet of paper having a reflectance different from that of a background portion in the invisible range. Therefore, even in the state of a sheet of paper such as multi-feed that is difficult to detect in the visible wavelength range, the state of the sheet of paper can be accurately detected.

First Example of First Embodiment

From the above-described results, it has been found that even in a case where a level difference does not occur between single feed and multi-feed on the short wavelength side, a level difference occurs between single feed and multi-feed by using the long wavelength side. That is, it has been found that it is possible to detect the multi-feed by using the invisible range with respect to the paper type in which the reflectance does nor change enough to detect the multi-feed in the visible range.

In this first example, an example of state detection using the visible range and the invisible range is described.

Figure 6:
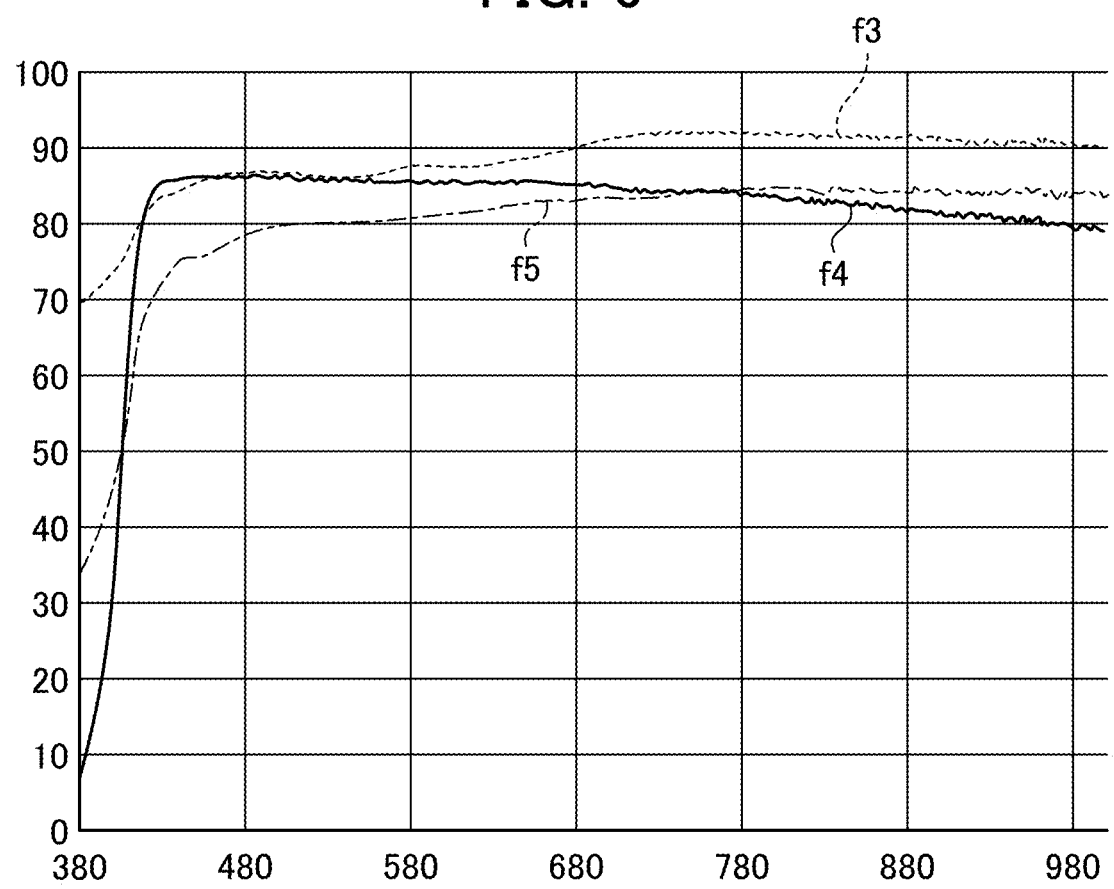
FIG. 6 is a chart illustrating a graph of a sheet of paper different in type from the sheets of paper illustrated in FIG. 5 in addition to the graphs of the sheets of paper and the background portion illustrated in FIG. 5.
Figure 7:
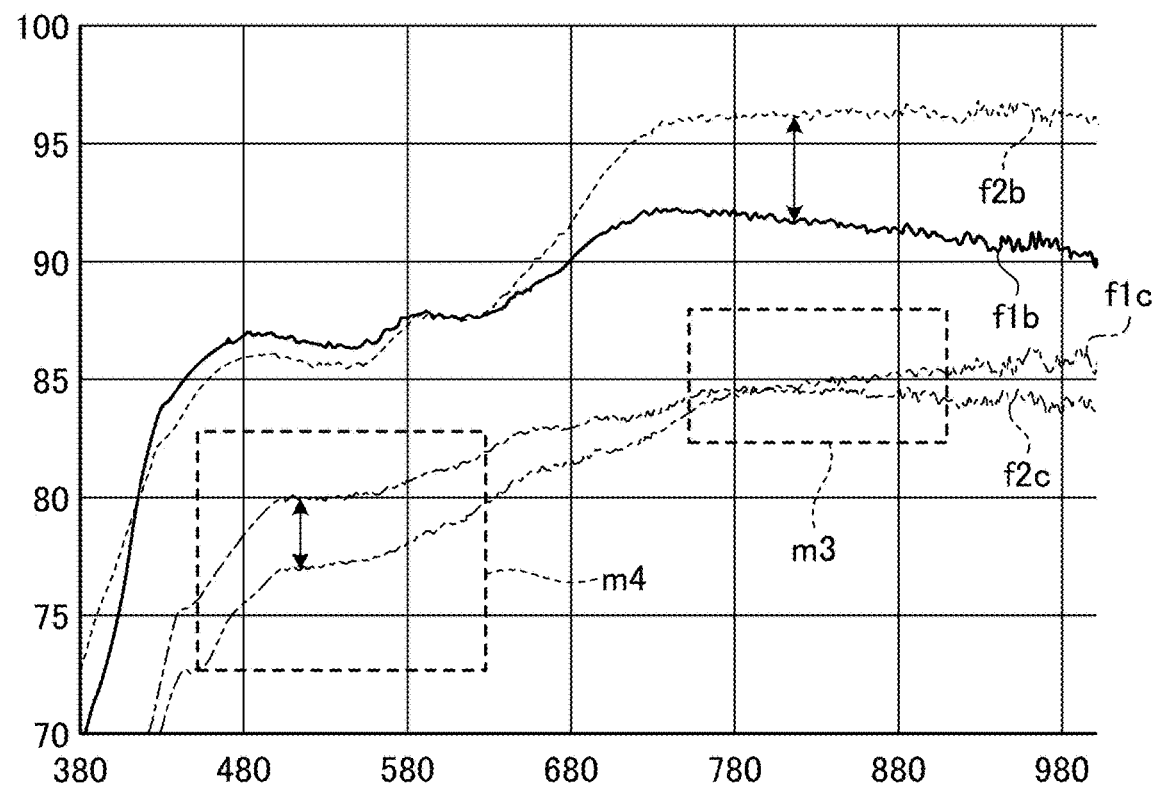
FIG. 7 is a diagram illustrating measurement results of reflectance of one sheet and two sheets of paper in different types of sheets of paper.

FIG. 6 and FIG. 7 are charts for explaining the expansion of the corresponding paper type when the visible range and the invisible range are complementarily used. FIG. 6 illustrates a graph f5 of a sheet of paper Y different in type from the sheet of paper X in addition to the graphs f3 and f4 of the sheet of paper X and the background portion illustrated in FIG. 5. As already described with reference to FIG. 5, for the sheet of paper X, the level difference does not appear between the single feed and the multi-feed in the short wavelength range side, that is, the visible range. However, the multi-feed can be detected by using the long wavelength range side, that is, the invisible range. On the other hand, in the sheet of paper Y, a level difference appears between single feed and multi-feed on the short wavelength range side, and the level difference becomes small on the long wavelength range side. Therefore, in the detection of multi-feed, the multi-feed is also detected using the visible range. When multi-feed is not detected in an invisible range, a visible range is complementarily used.

FIG. 7 illustrates the measurement results of the reflectance of one sheet and the reflectance of two sheets in the case of each of the sheet of paper X and the sheet of paper Y A graph f1b and a graph f2b of the measurement results of the sheet of paper X are the same graphs as the graph f1 and the graph f2 illustrated in FIG. 3. In addition, FIG. 7 illustrates a graph f1c and a graph f2c of measurement results when one sheet of paper is used and when two sheets of paper Y are used. As illustrated in FIG. 7, there is no difference between the sheet of paper Y and the sheet of paper X as illustrated in the range in the invisible range where there is a difference between the sheet of paper Y and the sheet of paper X. On the other hand, in the visible range where there is no difference in the sheet of paper X, there is a difference as illustrated in the range m4.

Therefore, complementarily using the invisible range and the visible range allows multi-feed to be detected on not only a paper type having characteristics like the sheet of paper X but also to a paper type having characteristics like the sheet of paper Y.

Figure 8:
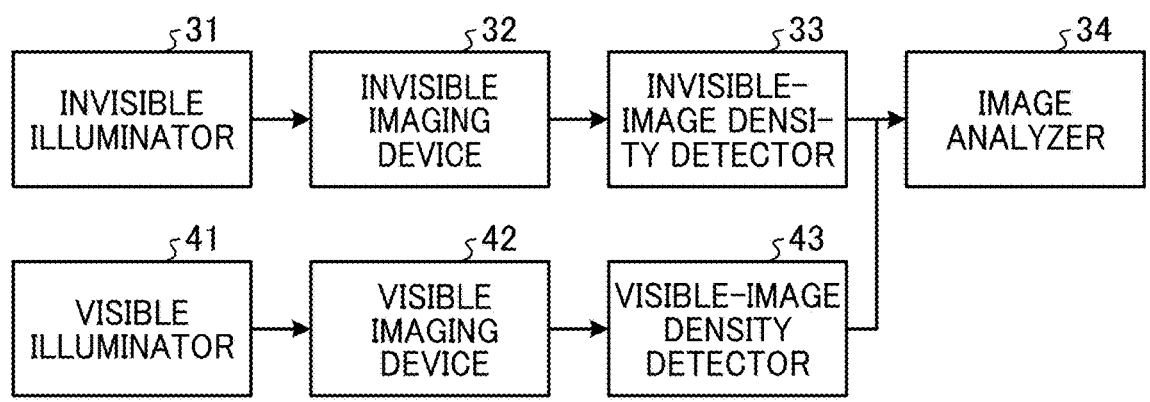
FIG. 8 is a diagram illustrating a configuration of a detector of a reading device according to an embodiment of the present disclosure.

FIG. 8 is a diagram illustrating a configuration of a detector of the reading device 1 according to an embodiment of the present disclosure. The configuration of the detector is described below in detail by taking the configuration of the reading device 1 (see FIG. 1) as an example.

The detector according to the present embodiment includes an invisible illuminator 31, an invisible imaging device 32, an invisible-image density detector 33, an image analyzer 34, a visible illuminator 41, a visible imaging device 42, and a visible-image density detector 43.

Here, the invisible illuminator 31 and the visible illuminator 41 are examples of an "illumination unit", the invisible imaging device 32 and the visible imaging device 43 are examples of an "imaging unit", and the invisible-image density detector 33, the visible-image density detector 43, and the image analyzer 34 are examples of a "detector".

Since the invisible illuminator 31, the invisible imaging device 32, and the invisible-image density detector 33 are the same as those illustrated in FIG. 2 and have already been described, the description thereof are omitted here.

The visible illuminator 41 is an illumination controller that illuminates an object to be read with visible light. The visible illuminator 41 includes the light source 13 illustrated in FIG. 1 and an illumination unit that lights on and of the light source 13. The illumination unit controls switching of an LED in the visible range of the light source 13 to ON or OFF. The illumination unit turns on the LED in the visible range to illuminate an object to be read with light in the visible range.

The visible imaging device 42 is an imaging controller that captures a visible image. For example, the visible imaging device 42 includes the first carriage 14, the second carriage 15, the lens unit 16, and the sensor board 17 illustrated in FIG. 1 and drives an imaging sensor in a visible range on the sensor board 17 to capture a visible image. Specifically, the visible imaging device 42 receives light in the visible range, more specifically, reflected light of light in the visible range illuminated on the object to be read by an imaging sensor in the visible range to capture a visible image.

Note that the visible illuminator 41 and the visible imaging device 42 may also serve as a unit that reads a document image, or may be dedicated to detection and provided separately from a unit that reads a document image. For example, an LED for reading an original image is illuminated, and a visible image read by an imaging sensor in a visible range is used for detection. The read document image may be used as the visible image. For example, an R imaging sensor may be used to read a document image, and another G or B imaging sensor may be used to read a visible image.

The above-described, configurations of the visible illuminator 41 and the visible imaging device 42 are examples, and the configurations of the visible illuminator 41 and the visible imaging device 42 are not limited to the above-described configurations.

The visible-image density detector 43 performs a density detection process on the visible image output from the visible imaging device 42. The density detection process is a process of detecting the density from the read value in the visible image. For example, the visible-image density detector 43 detects the density from the read value of the visible image of a background portion of a document sheet.

The image analyzer 34 outputs a state such as multi-feed of the document 100 from the density obtained by the density detection processing of each of the invisible-image density detector 33 and the visible-image density detector 43. For example, the image analyzer 34 compares the density value obtained based on the invisible image with a reference value (a density value p1+p2 of the background image in the invisible range in the case of one sheet of paper) held in advance, and outputs information indicating an abnormal state of the document when there is a predetermined difference between the density value and the reference value. Even when there is no predetermined difference in the density value in the invisible image, the image analyzer 34 compares the density value obtained based on the visible image with a reference value (a density value p1'+p2' of the background image in the visible range in the case of one sheet of paper) held in advance, and outputs information indicating an abnormal state of the document when there is a predetermined difference between the density value and the reference value, Here, the density value p1+p2 of the background image in the invisible range in the case of one sheet of paper is an example of the reference value corresponding to the invisible image. The density value p1+p2 of the background image in the visible range in the case of one sheet of paper is an example of the reference value corresponding to the visible image.

Figure 9:
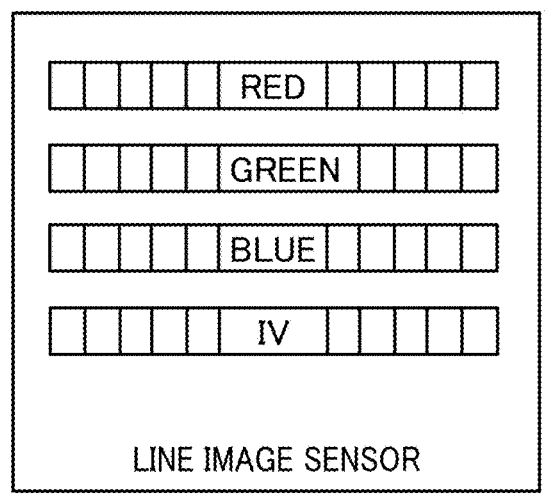
FIG. 9 illustrates imaging sensors on a sensor board, according to an embodiment of the present disclosure.

FIG. 9 illustrates imaging sensors on a sensor board, according to an embodiment of the present disclosure. FIG. 9 illustrates an example in which a line sensor having three channels of R (Red), G (Green), and B (Blue) for capturing a color visible image and a line sensor having one channel of IV (invisible) for capturing an invisible image are implemented.

In this example, three channels are used for picking up a visible image for a color image. However, at least one channel is sufficient for picking up a visible image. For example, in the case of a monochrome image, one channel can be used for a visible image and one channel can be used for an invisible image.

Figure 10:
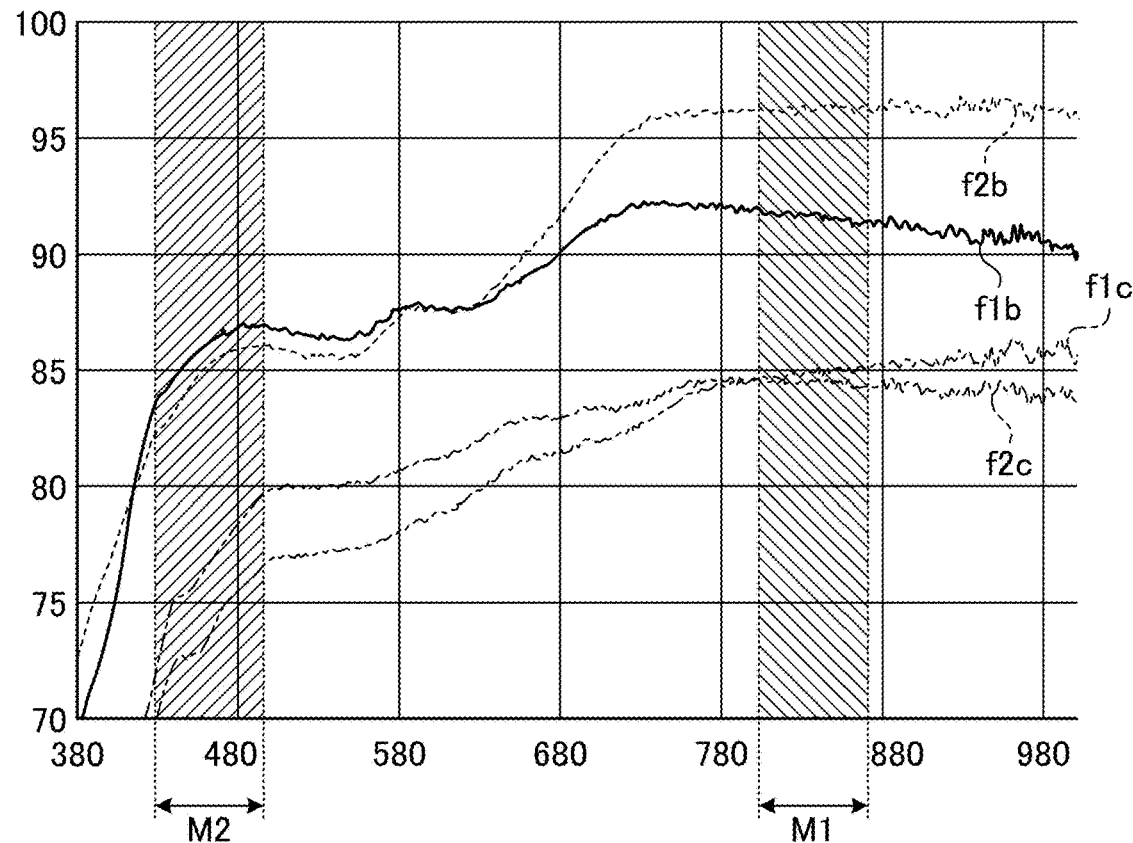
FIG. 10 is a chart illustrating a wavelength region set in a visible image in a case where the result of the invisible-image density detector and the result of the visible-image density detector are complementarily used.

FIG. 10 is a chart illustrating a wavelength range set in a visible image in a case where the result of the invisible-image density detector 33 and the result of the visible-image density detector 43 are complementarily used. FIG. 10 illustrates a graph similar to FIG. 7. The use of the visible range and the invisible range has already been described with reference to FIG. 7.

Here, a wavelength range desired to be used between the visible range and the invisible range is described with reference to FIG. 10. From FIG. 10, it can be seen that a large change (difference) can be obtained by using a wavelength range far from the set invisible range in the visible range when comparing the difference between single feed and multi-feed. That is, in this example, it is desirable to include or set a wavelength range M2, which is far from a set invisible range M1, in a wavelength range of the visible range. Since the wavelength range M2 is mainly a wavelength range of B (Blue), it is desirable to use the B channel to acquire a visible image.

Figure 11A:
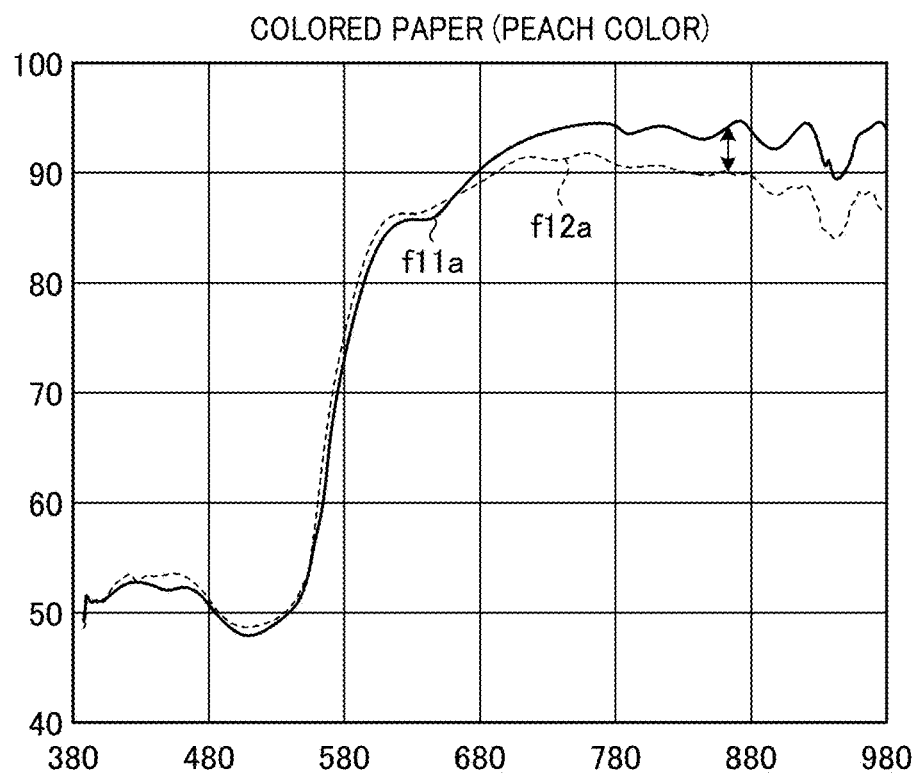
FIGS. 11A and 11B are graphs illustrating the measurement results of the reflectance of colored sheets of paper.
Figure 11B:
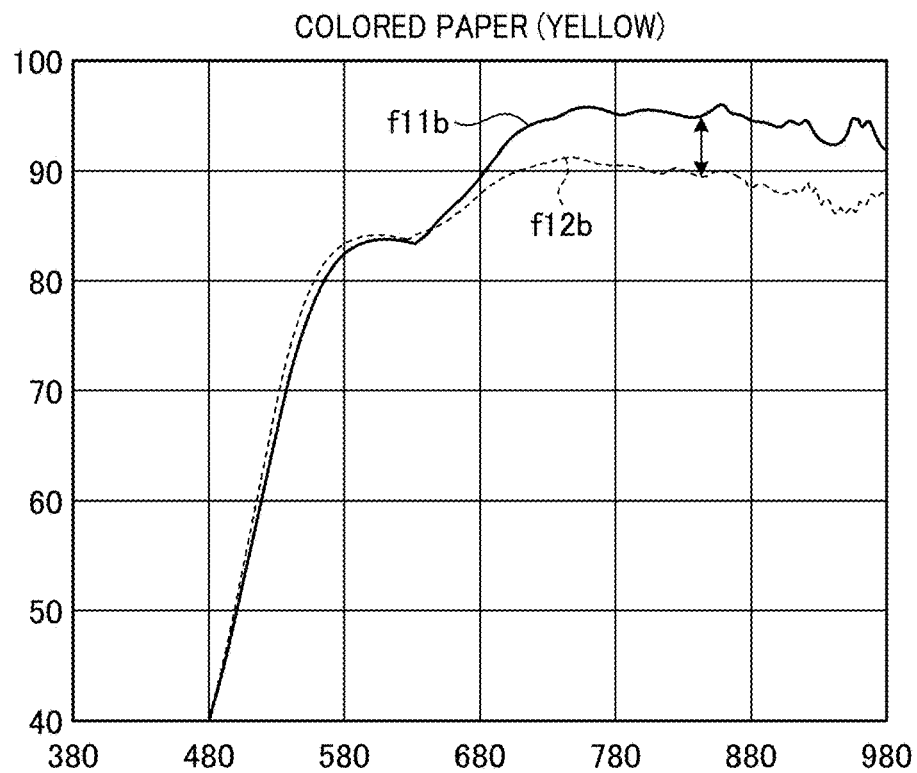

FIGS. 11A and 11B are graphs illustrating the measurement results of the reflectance of colored sheets of paper. FIG. 11A illustrates the measurement results when a pink sheet of paper is used. FIG. 11B illustrates the measurement results when a yellow sheet of paper is used. FIG. 11A and FIG. 11B are graphs illustrating the measurement results of reflectance when one sheet of paper is present and when two sheets of paper overlap each other. In FIG. 11A, a graph f11a and a graph f12a illustrate the measurement results of biz reflectance when one sheet of pink paper and when two sheets of pink paper overlap each other. In FIG. 11B, a graph f11b and a graph f12b illustrate the measurement results of reflectance when one sheet of yellow paper and when two sheets of yellow paper overlap each other. In the graph of each measurement result, the horizontal axis represents wavelength and the vertical axis represents reflectance.

From the measurement results of FIGS. 11A and 11B, the difference between the case of one sheet of paper and the case of two sheets of paper does not appear in the visible range but appears in the invisible range. This is because the light reflected by the color is measured in the visible range but light is transmissive in the invisible range. That is, using the invisible range allows measurement of the change in the reflectance between the case of one sheet and the case of two sheets even in the case of colored paper. Accordingly, the width for detecting the paper type increases, In addition, when the invisible range is used, the invisible light has color transparency. Accordingly, it is possible to detect multi-feed of documents including yellowing due to deterioration of paper, which cannot be handled by a conventional method.

Figure 12:
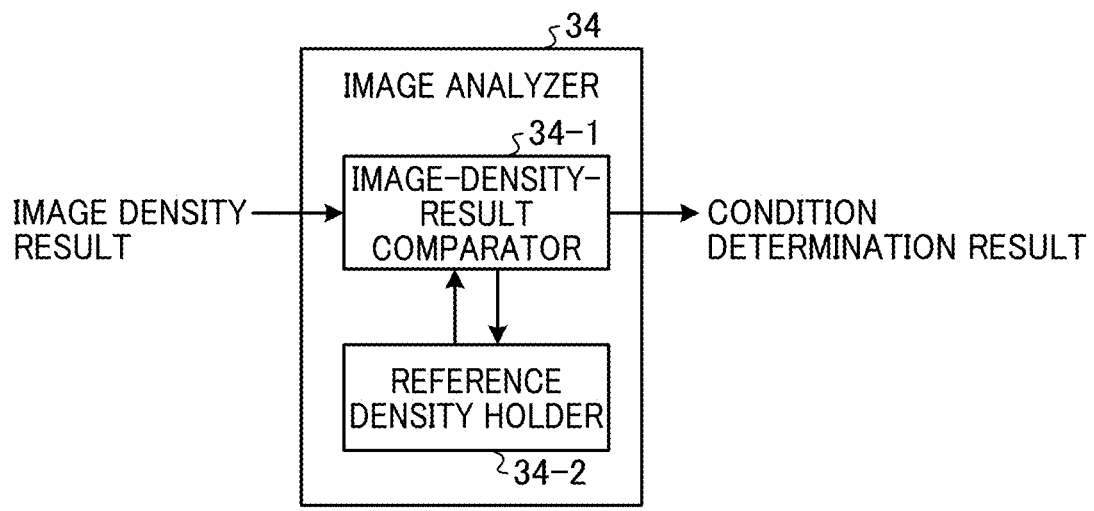
FIG. 12 is a diagram illustrating an image analyzer according to an embodiment of the present disclosure.

FIG. 12 is a diagram illustrating an image analyzer 34 according to an embodiment of the present disclosure. As illustrated in FIG. 12, the image analyzer 34 includes an image-density-result comparator 34-1 and a reference density holder 34-2.

The reference density holder 34-2 holds an image density result for at least one frame that is one or more frames before the image density result output from the preceding stage. The reference density holder 34-2 can also update the density reference result held by the reference density holder 34-2 with the image density result for one frame sequentially output, The image-density-result comparator 34-1 compares the density reference result held by the reference density holder 34-2 with the image density result output from the preceding stage to determine the state of the document, and outputs the determination result (state determination result).

The state determination result is output to the overall controller or the like. For example, when the state determination result indicates multi-feed, the overall controller interrupts the subsequent reading process and ejects the document being read. In order to notify the user of the occurrence of the multi-feed, an error indicating the multi-feed may be notified from the overall controller to, for example, a display unit.

In the present embodiment, the configuration has been described in which at least one previous read result is compared with the current read result. Such a configuration can reduce a change in the temperature characteristics of the sensor, the influence of contamination of the background portion, and the like, and detect the state of the document.

Figure 13:
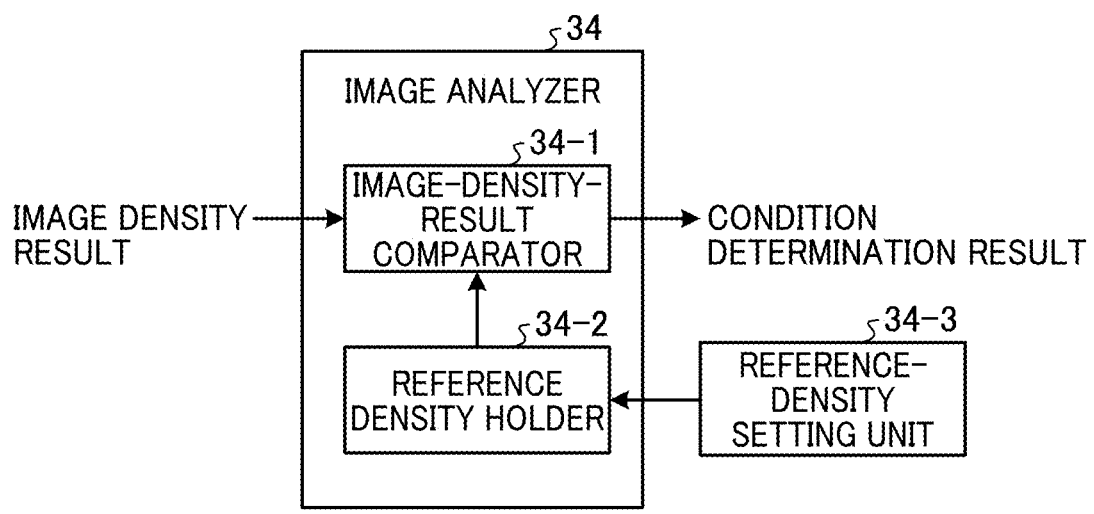
FIG. 13 is a diagram illustrating an image analyzer according to another embodiment of the present disclosure.

FIG. 13 is a diagram illustrating au image analyzer 34 according to another embodiment of the present disclosure. In the configuration illustrated in FIG. 12, since the image density result is not held in the reference density holder 34-2 in the processing of the first frame, the state of the document cannot be detected in the first frame. Therefore, a reference-density setting unit 34-3 is provided as a "setting unit", and a result (corresponding to an image density result) registered in advance in the reference-density setting unit 34-3 is set in the reference density holder 34-2 before the start of processing of the first frame. Such a configuration compares the reading result of the first frame with the result registered in advance, thus allowing detection of the state of the document.

Figure 14:
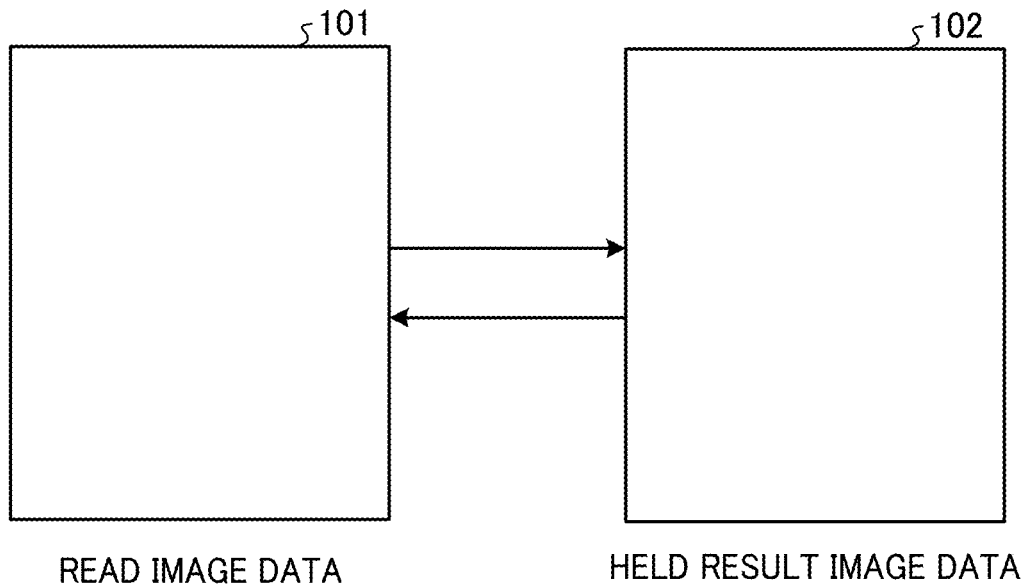
FIG. 14 is a diagram illustrating an example of the state detection process.

FIG. 14 is a diagram illustrating a specific example of the state detection process. FIG. 14 illustrates comparison of image density results for the entire image as a specific example of the state detection process. The background is extracted from the read entire image 101 to obtain the background level of the entire image 101. The background level is compared with the stored background level of the entire image 102. The state of the document 100 is detected based on the difference of the background level that is the comparison result between the background level of the read image and the background level of the held image.

In this method, the amount of data to be held is only one value indicating the background level of the entire image. The comparison can also be performed between one value indicating the background level and another value indicating the background level. Therefore, there is an advantage that the process can be performed with a small amount of calculation without increasing the circuit scale.

Note that the image described here refers to a visible image or an invisible image. When the visible-image density detector 43 is used, the image means a visible image, and when the invisible-image density detector 33 is used, the image means an invisible image.

Figure 15:
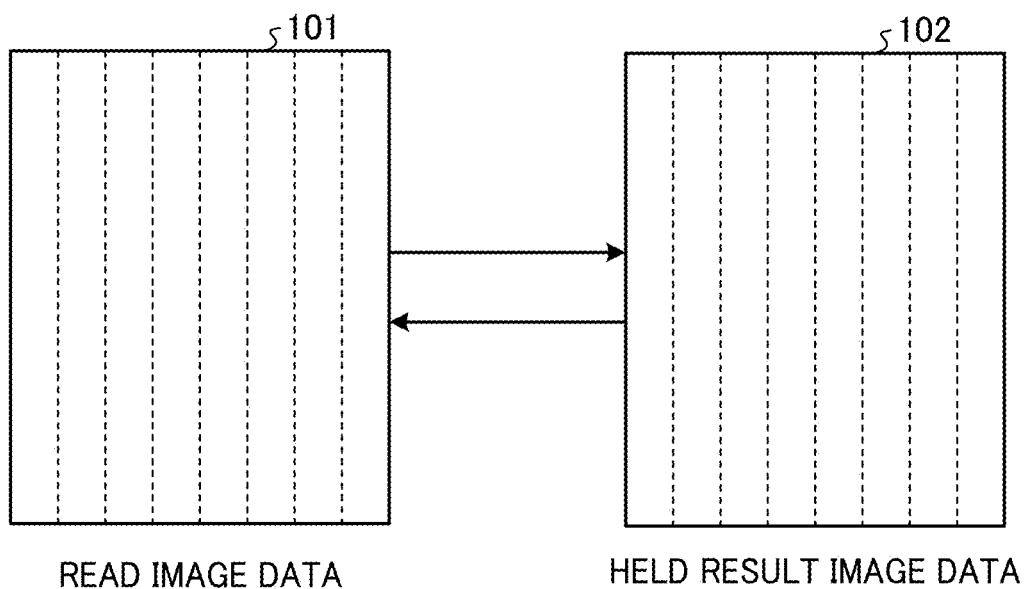
FIG. 15 is a diagram illustrating another example of the state detection process.

FIG. 15 is a diagram illustrating another example of the state detection process. Here, as another example, a description is given of a method of dividing the entire image into regions in the main scanning direction and acquiring the background level from the divided images.

FIG. 15 is a diagram illustrating a division pattern when the image density detector divides an image in the main scanning direction. In FIG. 15, divided regions of the division pattern are arranged in the main scanning direction of the image. Specifically, the Image density detector divides the entire image into a plurality of regions in the short-side direction (main scanning direction). The image density detector extracts a background level for each divided region.

The image analyzer compares the background level of each region extracted by the image density detector with the background level held in advance. (the background level extracted from the divided region in advance in another frame) to determine the state of the document for each region. The image analyzer detects the state of the document from the ratio (abnormal-state detection rate) of the region determined to be abnormal in the entire image.

The abnormal-state detection rate can be calculated by the following Equation 1, for example, when the number of divided regions is N and the number of regions detected as multi-feed or different types of documents is α.

Number of regions α/number of divided image regions=abnormal-state detection rate        Equation 1

According to Equation 1, when the abnormal-state detection rate exceeds a certain threshold value, it is determined as a state such as multi-feed or a different type of document.

Dividing the regions in the main scanning direction in this manner can reduce the following factors and prevent erroneous determination. One is the influence of variations of light in the main scanning direction. In the main scanning direction, variations arise in the way light strikes. Dividing an image into a plurality of regions in the main scanning direction and comparing regions having the same light incidence can reduce the influence of variations in density due to the variations of light in the main scanning direction and prevent erroneous determination. Another is to reduce the influence of sticky notes or cut-and-paste documents. When there is a sticky note or a cut-and-paste document, a peculiar change occurs in the reflectance in an image region and causes erroneous determination due to the influence thereof. However, such a peculiar region is only a part of the entire region. Therefore, when the regions are divided and the ratio of the peculiar region in the entire region is taken, the influence thereof is absorbed, thus allowing erroneous determination to be prevented.

Note that the image described here also refers to a visible image or an invisible image. When the visible-image density detector 43 is used, the image means a visible image, and when the invisible-image density detector 33 is used, the image means an invisible image.

Figure 16:
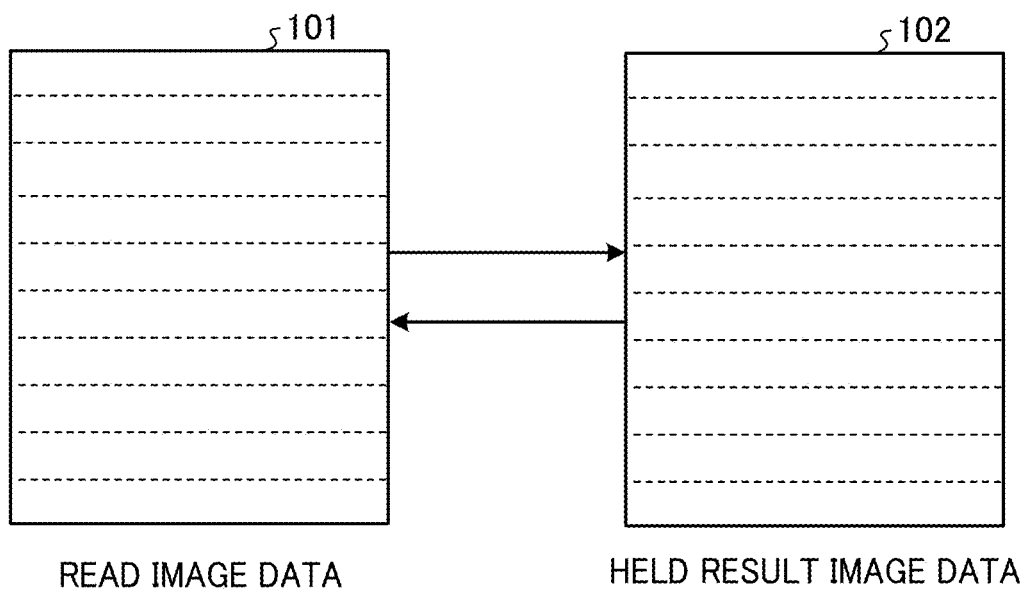
FIG. 16 is a diagram illustrating still another example of the state detection process.

FIG. 16 is a diagram illustrating still another example of the state detection process. Here, a method is described in which the entire image is divided into regions in the sub-scanning direction instead of the regional division in the main scanning direction illustrated in FIG. 15 and the background level is acquired from the divided images. The method of detecting the state based on regional division in the sub-scanning direction is mainly different from the method of detecting the state based on regional division in the main scanning direction described with reference to FIG. 15 in that the dividing direction is not the main scanning direction but the sub-scanning direction. Because of the division in the sub-scanning direction, the unit of division is, for example, a unit of one line or a unit of a plurality of lines, and the same divided regions in the sub-scanning direction can be compared with each other. Otherwise, the contents are substantially the same as those described with reference to FIG. 15. That is, the image density detector divides the entire image into a plurality of regions in the longitudinal direction (sub-scanning direction). The image density detector extracts a background level for each divided region. The image analyzer compares the background level of each region extracted by the image density detector with the background level held in advance (the background level extracted from the divided region in the sub-scanning direction in advance in another frame) to determine the state of the document for each region. The image analyzer detects the state of the document from the ratio (abnormal-state detection rate) of the region determined to be abnormal in the entire image. The abnormal-state detection rate can be calculated by, for example, Equation 1 described above. Since other descriptions are substantially the same as those of FIG. 15, the descriptions are omitted.

When the image is divided into regions in the sub-scanning direction, the following factors can be reduced to prevent erroneous determination. One is the influence of floating of the document. When a document enters the ADF, the leading edge of the document may float, and the density changes due to the influence of the floating. If the image is divided in the sub-scanning direction and the determination is made using each region, only a partial region of the entire image has the influence of the floating. Therefore, dividing the image into regions and taking the ratio of the partial region in all the regions, the influence can be absorbed, thus allowing erroneous determination to be prevented. Another is to reduce the influence of sticky notes or cut-and-paste documents. The reason why the influence is reduced is the same as that described with reference to FIG. 15. To prevent the repeat, the description thereof is omitted here.

Figure 17:
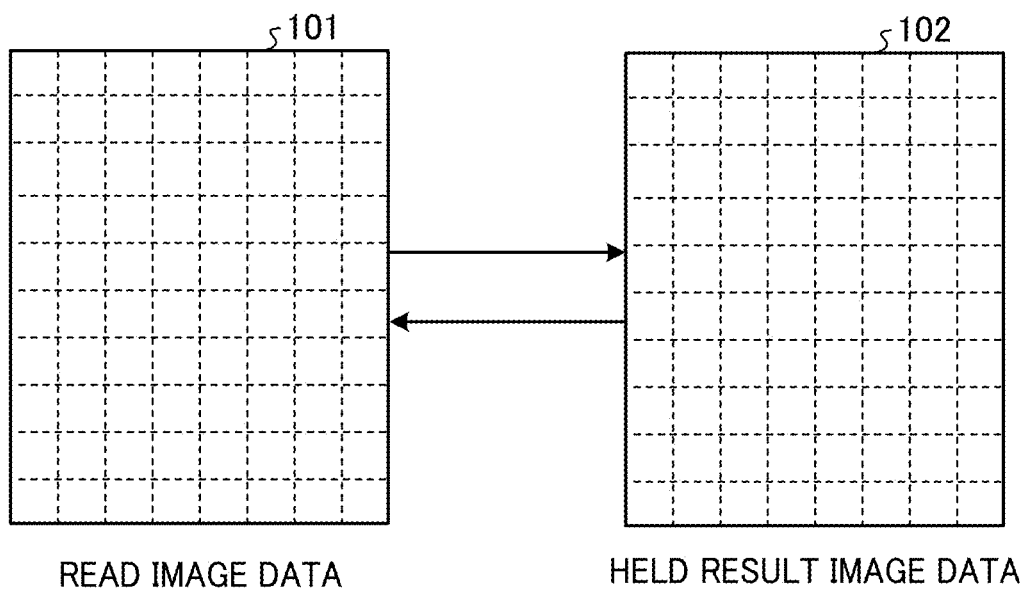
FIG. 17 is a diagram illustrating still yet another example of the state detection process.

FIG. 17 is a diagram illustrating still yet another example of the state detection process. Here, a description is given of a method of performing regional division in the main scanning direction illustrated as FIG. 15 and regional division in the sub-scanning direction illustrated in FIG. 16. That is, as in the grid-shaped divided image illustrated in FIG. 17, the image density detector acquires the background level from each divided image region divided in the main scanning region and the sub-scanning direction. The method of detecting the state based on regional division in the main scanning direction and the sub-scanning direction is different from the method of detecting the state based on regional division in the main scanning direction described in FIG. 15 in that the regional division is also performed in the sub-scanning direction described in FIG. 16. Since the regional division in the sub-scanning direction has been described with reference to FIG. 16, the method of detecting the state from each image region obtained by the regional division can be performed in substantially the same manner as the method described with reference to FIG. 15. Therefore, since other descriptions are substantially the same as those of FIG. 15, the descriptions are omitted.

The above-described configuration can reduce both the factor that occurs when an image is divided into regions in the main scanning direction, which has been described with reference to FIG. 15, and the factor that occurs when an image is divided into regions in the sub-scanning direction, which has been described with reference to FIG. 16, and further prevent erroneous determination.

For example, there are the following three methods for extracting the background level. In one method, the average value of object regions is set to the background level. In another method, the mode value of object regions is set to the background level. In still another method, the maximum value of object regions is set to the background level. The object regions are regions for which the values of the background level are individually calculated, for example, the entire image described above or individual divided regions in the case of regional division.

Figure 18:
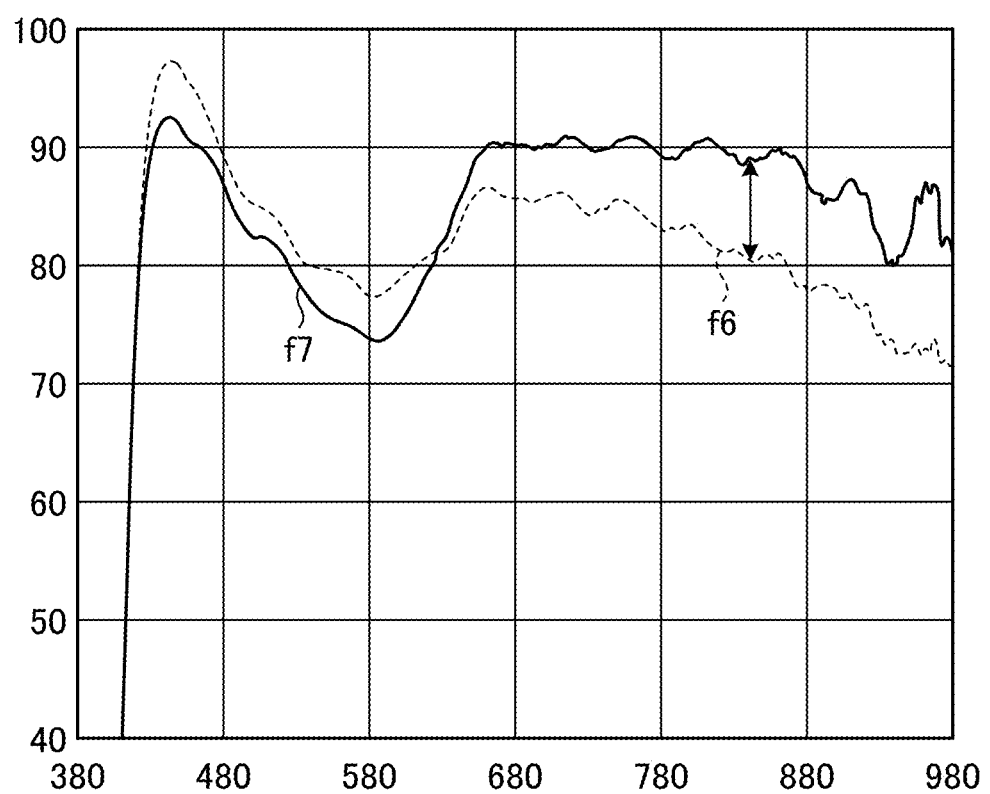
FIG. 18 is a chart for explaining that the state detection can be used to detect a different type of document.

FIG. 18 is a chart for explaining that the state detection can be used to detect a different type of document. The detection of a different type of document is a function necessary for noticing the mixing of a sheet thinner or thicker than an object document when a large number of the same documents are scanned. For example, if a thick sheet of paper having a ream weight of, for example, 90 kg is mixed in the case of scanning a large amount of thin sheets of paper having a ream weight 45 kg, the thick sheet of paper is detected as a different type of document.

FIG. 18 is a graph illustrating the measurement results of the reflectance of thin sheet of paper and thick sheet of paper having different ream weights. A graph f6 represents measurement results in the case of the ream weight 45 kg, and the graph f7 represents measurement results in the case of the ream weight 90 kg. When thin sheet of paper and thick sheet of paper are mixed, the graphs illustrated in FIG. 18 are obtained, and a large difference occurs in the reflectance in the invisible range. From this result, comparing the density levels of the background using the invisible range can detect a mixture of documents having different thicknesses.

As described above, using both visible light and invisible light can detect a state such as multi-feed by either one of the visible light and the invisible light. Thus, the ability to deal with paper types can be expanded.

Figure 19:
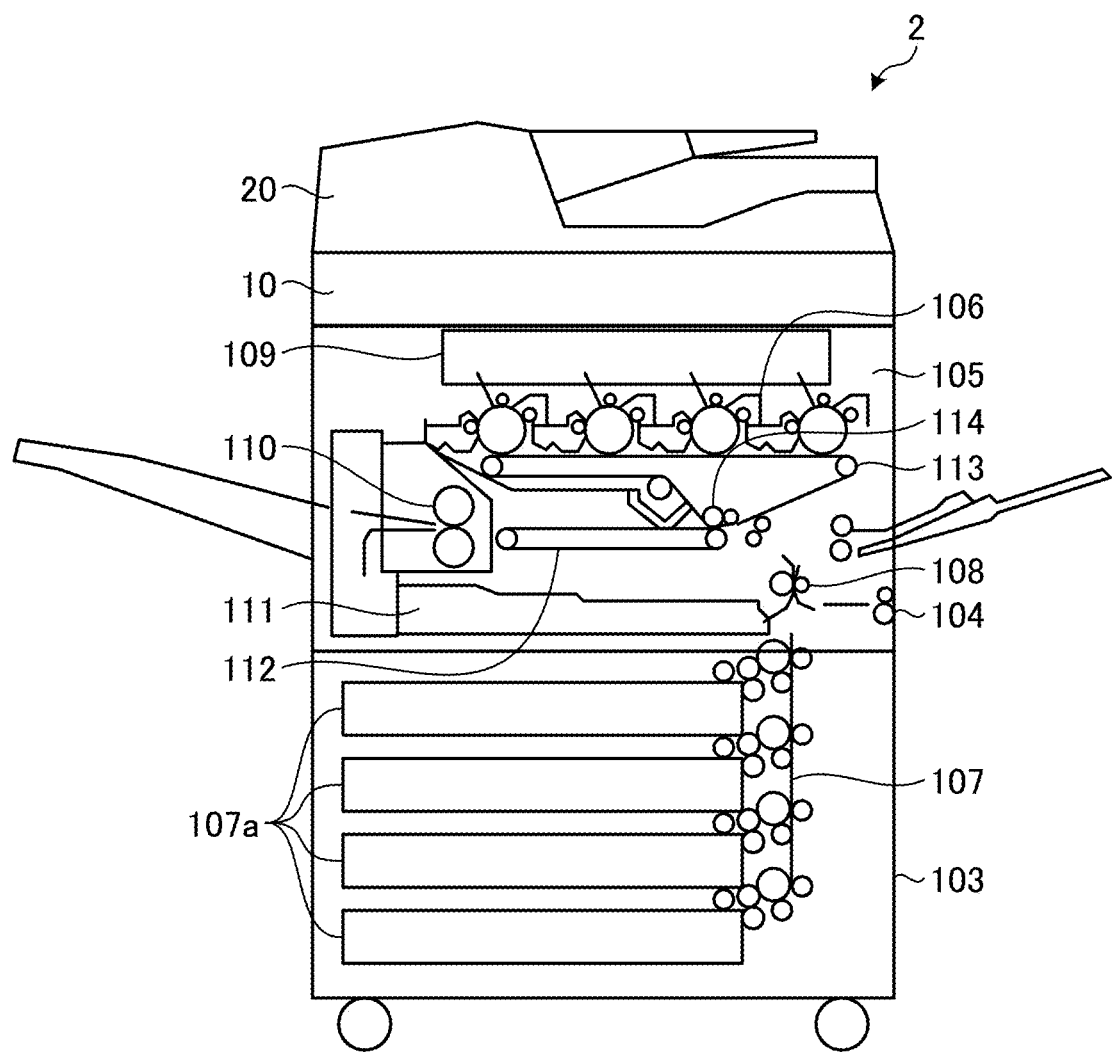
FIG. 19 is a schematic view illustrating a configuration of an image forming apparatus according to a second embodiment of the present disclosure.

A description is given of a second embodiment of the present disclosure. FIG. 19 is a schematic view illustrating a configuration of an image forming apparatus 2 according to the second embodiment. The image forming apparatus 2 illustrated in FIG. 19 has at least two of a photocopying function, a printing function a scanning function, and a facsimile (FAX) function, and is referred to as a multifunction printer or multifunction peripheral (MFP) in general.

The image forming apparatus 2 is provided with an reading device main body 10 and an automatic document feeder (ADF) 20 that together serve as an image reading device, and is further provided with an image forming device 103 on the downside.

In the ADF 20, a document is fed, a surface to be read is read at a scanning position or scanning window, and the document is ejected to an output tray. The reading device main body 10 reads the surface to be read of the document at the scanning position. The ADF 20 according to the present embodiment is equivalent to the ADF 20 according to the first embodiment (see FIG. 1), and the reading device main body 10 according to the present embodiment is equivalent to the reading device main body 10 according to the first embodiment (see FIG. 1), As the ADF 20 and the reading device main body 10 have already been described in the first embodiment, further description of the ADF 20 and the reading device main body 10 is omitted.

In FIG. 19, an external cover of the image forming device 103 is detached to illustrate the inner structure. The image forming device 103 prints a document image scanned and read by the reading device main body 10. The image forming device 103 includes a bypass feeding roller pair 104 through which a recording medium is manually inserted and a recording sheet feeder 107 that supplies a recording medium. In the present embodiment, the recording sheet is an example of a recording medium. The recording sheet feeder 107 includes an assembly that sends out recording media one by one from vertically-aligned sheet trays 107a. The recording sheet thus fed is sent to a secondary transfer belt 112 via a registration roller pair 108.

Onto the recording sheet conveyed on the secondary transfer belt 112, a transfer device 114 transfers a toner image from an intermediate transfer belt 113.

The image forming device 103 further includes an optical writing device 109, a tandem image forming unit 105 for yellow (Y), magenta (M), cyan (C), and black (K), the intermediate transfer belt 113, and the secondary transfer belt 112. Specifically, in an image forming process, the image forming unit 105 forms an image (a visible image) written by the optical writing device 109, as a toner image, on the intermediate transfer belt 113.

Specifically, the image forming unit (for Y, M, C, and K) 105 includes four photoconductor drums (Y, M, C, and K) in a rotatable manner, and image forming elements 106 around the respective photoconductor drums. The image forming elements 106 include a charging roller, a developing device, a primary transfer roller, a cleaner unit, and a discharger. As the image forming element 106 operates on each photoconductor drum, the image on the photoconductor drum is transferred onto the intermediate transfer belt 113 by each primary transfer roller.

The intermediate transfer belt 113 is in the nips between the photoconductor drums and the corresponding primary transfer rollers and stretched by a drive roller and a driven roller. The toner image primarily transferred onto the intermediate transfer belt 113 secondarily transferred onto the recording sheet an the secondary transfer belt 112 by a secondary transfer device as the intermediate transfer belt 113 runs. As the secondary transfer belt 112 travels, the recording sheet is conveyed to a fixing device 110, where the toner image is fixed as a color image on the recording sheet. Then, the recording sheet is discharged onto an output tray disposed outside the image forming apparatus 2. In a case of duplex printing, a reverse assembly 111 reverses the recording sheet upside down and sends out the reversed recording sheet onto the secondary transfer belt 112.

The image forming device 103 is not limited to the one that forms an image by an electrophotographic method as described above. The image forming device 103 may be one that forms an image by an inkjet method.

Such a configuration of the reading device may be provided in a subsequent stage of the bypass feeding roller pair 104 through which a recording sheet is manually inserted or in a conveyance path through which a recording sheet passes after the recording sheet feeder 107 feeds the recording sheet from the vertically-aligned sheet trays 107a. Such configurations can notify the user of the abnormality before the image formation on the recording sheet and to urgently stop the image forming apparatus when recording sheets are double-fed or different kinds of recording sheets are mixed.

In the above description, preferred embodiments of the present disclosure and the modifications of those embodiments of the present disclosure are described. However, the description of the above embodiments and the modifications of those embodiments is given by way of example, and no limitation is intended thereby. Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims, in addition, the embodiments and modifications or variations thereof are included in the scope and the gist of the invention, and are included in the invention described in the claims and the equivalent scopes thereof.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes, devices such as an application specific integrated circuit (ASIC), digital signal processor (DSP), field programmable gate array (FPGA), and conventional circuit components arranged to perform the recited functions.

The invention claimed is:

1. A reading device comprising:
an illuminator to illuminate an object to be read with light in an invisible wavelength range;
an imager to capture an image of the light reflected from the object to be read, within the invisible wavelength range; and
a memory to hold a reference value of the object to be read; and
a detector to detect a state of the object to be read, based on a difference between a level of a reading value of an invisible image captured within the invisible wavelength range using the light reflected from the object which was captured by the imager and a level of the reference value,
wherein the illuminator is to illuminate the object to be read with light in a visible wavelength range,
wherein the imager is to capture an image of the light reflected from the object to be read, within the visible wavelength range,
wherein the memory is to hold, as the reference value of the object to be read, a reference value corresponding to the invisible image and a reference value corresponding to a visible image captured within the visible wavelength range, and
wherein the detector is to compare the level of the reading value of the invisible image with a level of the reference value corresponding to the invisible image and compare a level of a reading value of the visible image with a level of the reference value corresponding to the visible image, to detect the state of the object to be read,
wherein the detector is to detect whether the state of the object to be read is a state of multi-feed.

2. The reading device according to claim 1,
wherein at least a wavelength range farther from the invisible wavelength range is included in the visible wavelength range.

3. The reading device according to claim 1,
wherein the memory is to hold, as the reference value corresponding to the invisible image, the level of the read value obtained by the detector at least one frame before.

4. The reading device according to claim 1, further comprising setting circuitry configured to set the reference value corresponding to the invisible image in the memory.

5. The reading device according to claim 1,
wherein the detector is to compare a background level, which is a level of a reading value obtained from an entire background of the image, with the reference value corresponding to the invisible image to detect the state of the object to be read.

6. The reading device according to claim 1,
wherein the detector is to compare a background level of each of divided regions of the image in a main scanning direction with the reference value corresponding to the invisible image to detect the state of the object to be read.

7. The reading device according to claim 1,
wherein the detector is to compare a background level of each of divided regions of the image in a sub-scanning direction with the reference value corresponding to the invisible image to detect the state of the object to be read.

8. The reading device according to claim 1,
wherein the detector is to compare a background level of each of divided regions of the image in a main scanning direction and a sub-scanning direction with the reference value corresponding to the invisible image to detect the state of the object to be read.

9. The reading device according to claim 5,
wherein the background level is an average value, a mode value, or a maximum value of regions to be calculated for determination of the background level.

10. The reading device according to claim 1,
wherein the detector is to detect whether different types of documents are mixed as the state of the object to be read.

11. The reading device according to claim 1, further comprising a feeder to feed the object to be read,
wherein the feeder is to feed the object to be read to a reading position at which the object to be read is illuminated with the light of the illuminator with a background portion placed at a back surface of the object.

12. An image forming apparatus comprising:
the reading device according to claim 1; and
an image forming device to form, on a medium, an image of the object read by the reading device.

13. A state detection method comprising:
illuminating an object to be read with light in an invisible wavelength range;
capturing an image of the light reflected from the object to be read, within the invisible wavelength range; and
detecting a state of the object to be read based on a difference between a level of a reading value of an invisible image captured by the light reflected from the object within the invisible wavelength range and a level of a reference value held in a memory,
wherein the illuminating is to illuminate the object to be read with light in a visible wavelength range, and
wherein the capturing is to capture an image of the light reflected from the object to be read, within the visible wavelength range,
wherein the memory is to hold, as the reference value of the object to be read, a reference value corresponding to the invisible image and a reference value corresponding to a visible image captured within the visible wavelength range, and
wherein the detecting is to compare the level of the reading value of the invisible image with a level of the reference value corresponding to the invisible image and compare a level of a reading value of the visible image with a level of the reference value corresponding to the visible image, to detect the state of the object to be read,
wherein the detecting is to detect whether the state of the object to be read is a state of multi-feed.

* * * * *